United States Patent
Wilf et al.

(10) Patent No.: US 6,384,871 B1
(45) Date of Patent: May 7, 2002

(54) METHOD AND APPARATUS FOR AUTOMATIC ELECTRONIC REPLACEMENT OF BILLBOARDS IN A VIDEO IMAGE

(75) Inventors: Itzhak Wilf, Ramat-Gan; Avi Sharir, Ramat Hasharon; Michael Tamir, Tel-Aviv, all of (IL)

(73) Assignee: Orad Hi-Tec Systems Limited (IL)

(*) Notice: Subject to any disclaimer, the term of this patent is extended or adjusted under 35 U.S.C. 154(b) by 0 days.

(21) Appl. No.: 09/703,442

(22) Filed: Nov. 1, 2000

Related U.S. Application Data

(63) Continuation of application No. 08/776,038, filed as application No. PCT/GB96/02226 on Sep. 9, 1996, now Pat. No. 6,208,386.

(30) Foreign Application Priority Data

Sep. 8, 1995 (GB) .............................................. 9518439
Jan. 19, 1996 (GB) .............................................. 9601101

(51) Int. Cl.[7] .......................... H04N 5/262; H04N 5/225
(52) U.S. Cl. ........................ 348/578; 348/157; 348/135; 348/140; 348/580
(58) Field of Search ................................ 348/578, 744, 348/157, 143, 135, 137, 140, 580, 586, 587, 592, 39; 386/107, 117; 358/906; H04N 5/262, 5/225

(56) References Cited

U.S. PATENT DOCUMENTS

| | | | |
|---|---|---|---|
| 2,974,190 A | 3/1961 | Geiger | 178/7.1 |
| 3,840,699 A | 10/1974 | Bowerman | 348/169 |

(List continued on next page.)

FOREIGN PATENT DOCUMENTS

| | | |
|---|---|---|
| JP | 57-93788 | 12/1980 |
| WO | WO 93/02524 | 2/1993 |
| WO | WO 93/06691 | 4/1993 |
| WO | WO 94/05118 | 3/1994 |
| WO | WO 95/30312 | 11/1995 |
| WO | WO 97/09823 | 3/1997 |

OTHER PUBLICATIONS

Adiv, G., "Determining Three–Dimensional Motion and Structure from Optical Flow Generated by Several Moving Objects", *IEEE trans. Pattern analysis and Machine Intelligence*, 1985, 7, 384–401.

Cafforio et al., "The Differential Method for Motion Estimation", in: Image Sequence Processing and Dynamic Scene Analysis, T.S. Haung (ed.) spring, Berlin, 1983 104–124.

(List continued on next page.)

Primary Examiner—Reinhard J. Eisenzopf
Assistant Examiner—Jean W. Désir
(74) Attorney, Agent, or Firm—Woodcock Washburn LLP

(57) ABSTRACT

Apparatus for automatic electronic replacement of a billboard in a video image including an automatic camera orientation measurement apparatus including motion measurement means operative to measure the Field of View (FOV) of the TV camera relative to a known reference position.

25 Claims, 16 Drawing Sheets

U.S. PATENT DOCUMENTS

| | | | |
|---|---|---|---|
| 3,887,762 A | 6/1975 | Uno et al. .................... | 178/6 |
| 3,973,239 A | 8/1976 | Kakumoto et al. ....... | 340/146.3 |
| 4,000,399 A | 12/1976 | Kawahara .................... | 235/92 |
| 4,010,446 A | 3/1977 | Kawa ....................... | 340/146.3 |
| 4,064,528 A | 12/1977 | Bowerman ................... | 348/578 |
| 4,200,890 A | 4/1980 | Inaba et al. ................. | 358/183 |
| 4,393,394 A | 7/1983 | McCoy ....................... | 358/22 |
| 4,394,680 A | 7/1983 | Watanabe .................... | 358/22 |
| 4,396,939 A | 8/1983 | Kitahama .................... | 358/22 |
| 4,409,611 A | 10/1983 | Vlahos ....................... | 358/22 |
| 4,409,618 A | 10/1983 | Inaba et al. ................. | 358/183 |
| 4,488,169 A | 12/1984 | Yamamoto .................... | 358/22 |
| 4,533,937 A | 8/1985 | Yamamoto et al. ........... | 358/22 |
| 4,547,897 A | 10/1985 | Peterson ...................... | 382/8 |
| 4,566,126 A | 1/1986 | Miyagawa et al. ........... | 382/48 |
| 4,621,280 A | 11/1986 | Shinohara et al. ............ | 358/22 |
| 4,628,363 A | 12/1986 | Kashiwa et al. ............. | 358/183 |
| 4,630,101 A | 12/1986 | Inaba et al. .................. | 358/22 |
| 4,947,240 A | 8/1990 | Hausdorfer .................. | 358/22 |
| 4,949,165 A | 8/1990 | Riemann et al. ............. | 358/10 |
| 4,965,844 A | 10/1990 | Oka et al. .................... | 395/125 |
| 4,979,021 A | 12/1990 | Thomas ....................... | 358/22 |
| 5,264,933 A | 11/1993 | Rosser et al. ............... | 358/183 |
| 5,353,392 A | 10/1994 | Luquet et al. .............. | 395/135 |
| 5,459,793 A | 10/1995 | Naoi et al. ................... | 382/165 |
| 5,488,675 A | 1/1996 | Hanna ........................ | 382/284 |
| 5,491,517 A | 2/1996 | Kreitman et al. ........... | 348/581 |
| 5,502,482 A | 3/1996 | Graham ...................... | 348/140 |
| 5,515,485 A | 5/1996 | Luquet et al. ............... | 395/135 |
| 5,543,856 A | 8/1996 | Rosser et al. ............... | 348/578 |
| 5,559,695 A * | 9/1996 | Daily .................... | 364/424.01 |
| 5,912,700 A | 6/1999 | Honey et al. ............... | 348/157 |
| 5,917,553 A | 6/1999 | Honey et al. ............... | 348/578 |

OTHER PUBLICATIONS

Weng et al., "Calibration of Stereo Cameras Using A Non–Linear Distortion Model", *IEEE 10th. Intl. Conf. Pattern Recognition,* Jun. 16–21, 1990, 246–253.

Sommerhauser, F., "Das Virtuelle Studio Grundlaged Einer Neuen Studioproduktionstechnik", Fernseh–Und Kino–Technik 50, Jahrgang Nr. 1–2/1996.

Canny, J.A., "Computational Approach to Edge Detection", *IEEE Trans. On PAMI, PAMI*—8(6), 1986, 679–698.

Illingworth et al., "A Survey of the Hough Transform", *CVGIP,* 1988, 44, 87–116.

Serra, J., "Image Analysis and Mathamatical Morphology", Academic Press, London, 1982, 271–317.

Rosenfeld et al., "Digital Picture Processing", Academic Press, 1982.

Weng et al. Calibration of stereo cameras using a non–linear distortion model, IEEE 10th. Int. Conf. Pattern Recognition 1990 246–253.

Cafforio et al. The differential method for motion estimation, in: T.S. Huang, e.g., Image sequence processing and dynamic scene analysis, Spring, Berlin, 1983 pp. 104–124.

Adiv, G. Determining Three–Dimensional Motion and Structure from Optical Flow Generated by Several moving objects, IEEE Trans. Pattern Analysis and Machine Intelligence 1985 7:384–401.

Sommerhauser F. Das Virtuelle Studio Grundlagen Einer Neuen Studioproduktionstechnik Fernseh–Und Kino–Technik 50 Jahrgang Nr. 1–2/1996.

* cited by examiner

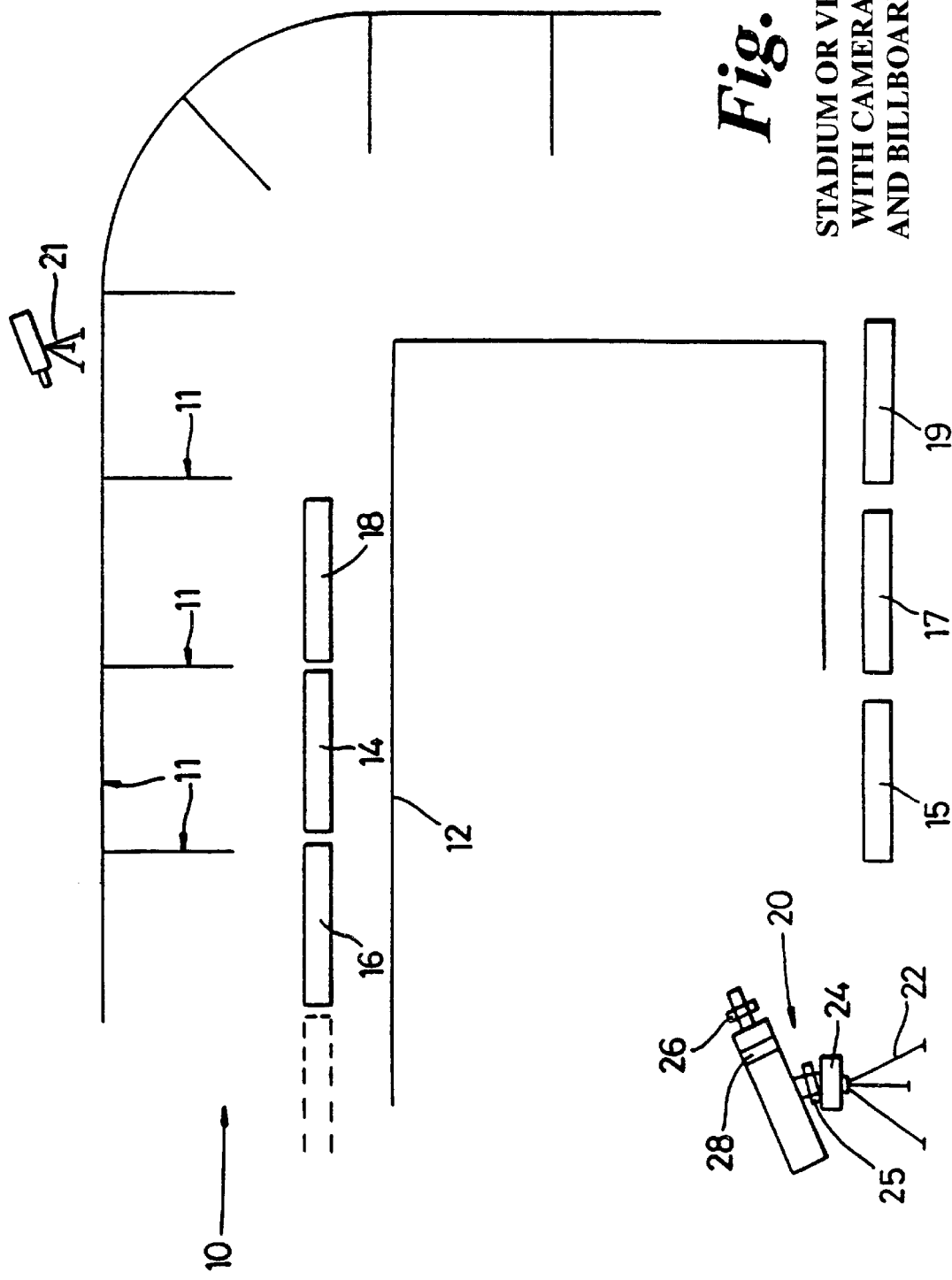

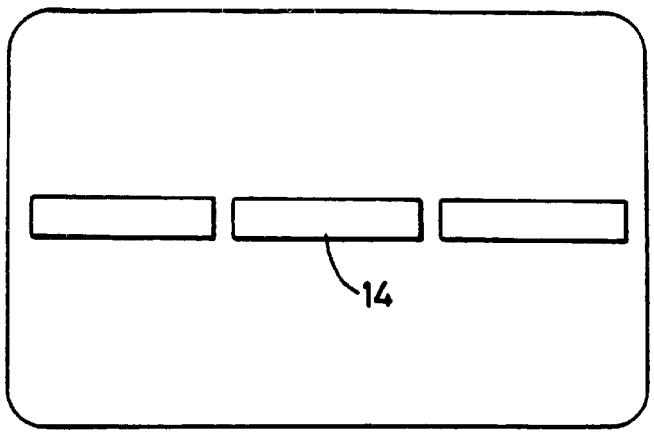
VIDEO IMAGE OF THE STADIUM WITH BILLBOARD 14
CENTERED IN THE FIELD OF VIEW
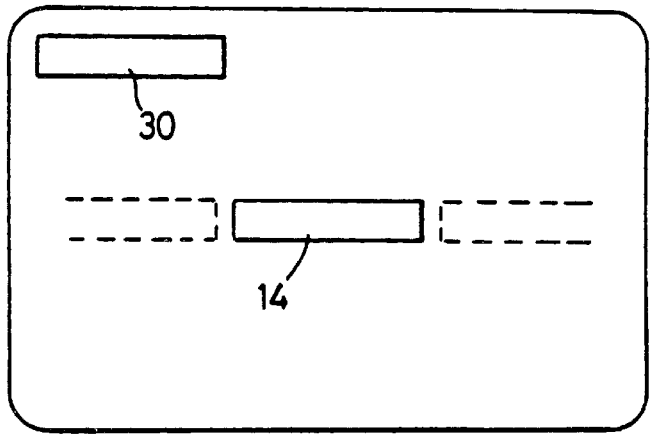
VIDEO IMAGE OF THE STADIUM WITH BILLBOARDS
AT DIFFERENT HEIGHTS
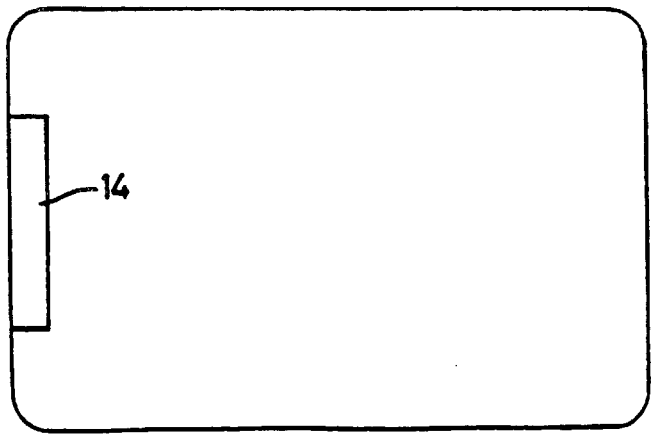
BILLBOARD ENTERING THE CAMERA'S FIELD OF VIEW
AS THE CAMERA PANS

PATTERNED CHROMA-KEY BILLBOARD

| camera intrinsic parameters store ||
|---|---|
| zoom Z1 focus F1 | camera parameters record (1,1) |
|  |  |
| zoom Zm focus Fn | camera parameters record (m,n) | camera parameters record:
magnification: Mx,My
center: Xc,Yc
aberrations: g1,g2,g3,g4,k1

*Fig. 12*

1. setup rotation matrix

$$R_s = \begin{bmatrix} \cos(P_s) & 0 & -\sin(P_s) \\ 0 & 1 & 0 \\ \sin(P_s) & 0 & \cos(P_s) \end{bmatrix} \begin{bmatrix} 1 & 0 & 0 \\ 0 & \cos(T_s) & \sin(T_s) \\ 0 & -\sin(T_s) & \cos(T_s) \end{bmatrix}$$

— 600

2. prediction rotation matrix

$$R_p = \begin{bmatrix} \cos(P_p) & 0 & -\sin(P_p) \\ 0 & 1 & 0 \\ \sin(P_p) & 0 & \cos(P_p) \end{bmatrix} \begin{bmatrix} 1 & 0 & 0 \\ 0 & \cos(T_p) & \sin(T_p) \\ 0 & -\sin(T_p) & \cos(T_p) \end{bmatrix}$$

— 602

3. setup to prediction perspective transformation

$$R_{sp} = R_s^{-1} R_p$$

— 604

4. setup to prediction point transformation

$$u_p = \frac{R_{sp}[0][0]u_s + R_{sp}[1][0]v_s + R_{sp}[2][0]}{R_{sp}[0][2]u_s + R_{sp}[1][2]v_s + R_{sp}[2][2]}$$

$$v_p = \frac{R_{sp}[0][1]u_s + R_{sp}[1][1]v_s + R_{sp}[2][1]}{R_{sp}[0][2]u_s + R_{sp}[1][2]v_s + R_{sp}[2][2]}$$

— 606

5. image plane to frame-buffer

$$x = (u - A_u(u,v)) M_X + X_C$$
$$y = (v - A_v(u,v)) M_Y + Y_C$$

— 608

6. aberrations

BILLBOARDS 1, 3, 5 AT DIFFERENT LIGHTING CONDITIONS
DUE TO LIGHTS 7, 9, 13 AND WITH VIRTUAL BOXES 1', 3' AND 5'
WHICH IDENTIFY THEIR LOCATIONS

GRAPH OF MAXIMUM
AND MINIMUM
LIGHTING VALUES

VIEW OF BILLBOARD 1
BEING OCCLUDED
BY OBJECT 13

| BILLBOARD STATIC AND DYNAMIC SET UP DATA STORE | | | | | |
|---|---|---|---|---|---|
| STATIC IMAGE DATA | STATIC SET UP DATA | DYNAMIC CALIBRATION DATA | | | |
| | | PAN L-R | PAN R+L | TILT UP | TILT DOWN |
| B/BOARD 1 | B/BOARD 1 | B/B 1 | B/B 1 | B/B 1 | B/B 1 |
| 906 | 908 | 2002 | 2004 | 2006 | 2008 |
| B/BOARD M | B/BOARD M | B/B M | B/B M | B/B M | B/B M |

*Fig. 20*

METHOD AND APPARATUS FOR AUTOMATIC ELECTRONIC REPLACEMENT OF BILLBOARDS IN A VIDEO IMAGE

This Application is a continuation of U.S. provisional Application Ser. No. 08/776,038 filed May 13, 1997. entitled "Method and Apparatus For Automatic Electronic Replacement of Billboards In A Video Image," now U.S. Pat. No. 6,208,386 which was filed on Sep. 9, 1996 as International Application No. PCT/GB96/02226 and was a filing in the United States under 35 U.S.C. §371 and claims the benefit under 35 U.S.C. §119 of the filing date of this application and the benefit of the filing date of United Kingdom Applications 9518439.6 and 9601101.0 filed on Sep. 8, 1995 and Jan. 19, 1996 respectively.

FIELD OF THE INVENTION

The present invention relates to a method and apparatus for automatically replacing billboards in a vide image.

BACKGROUND OF THE INVENTION

The present invention has particular use in electronic replacement of billboards in a stadium or other venue but can be used to provide accurate data relating to camera orientation for other purposes.

In previous systems it has been proposed to electronically replace billboards in a stadium which are viewed by a viewer on television. The billboards in the stadium are televised by a TV camera and the boards are electronically altered so that the TV viewer at home sees a different board to the spectator in the stadium or other venue.

The known systems such as those described in U.S. Pat. No. 5,266,933, an apparatus and method for electronically altering video images is disclosed. The apparatus and method disclosed in the U.S. patent and also in U.S. Pat. No. 5,353,392 whilst theoretically allowing replacement of billboards do not solve the many practical problems encountered in real environments. Most of these problems are related to the recognition and replacement processes.

Relying entirely on pattern recognition techniques which utilize only the video signal to identify and localise billboards for replacement introduces major problems which affect the practical value of such a system.

Clearly, any pattern recognition scheme, including those described in U.S. Pat. No. 5,264,933 and U.S. Pat. No. 5,353,392 must rely on useful visible features in the image that can be compared with pre-defined descriptions. Such features should be located inside the billboard or at its neighbourhood.

In realistic situations, the visibility of these features might change, continuously or otherwise from practically zero to a some threshold visibility which allows the pattern recognition scheme to work properly. These changes can occur in the direction of growing or reducing visibility.

Such situations include:

Acceleration or de-acceleration of camera motion introducing a huge amount of blur.

Excessive zooming-in or zooming-out of the billboard.

Excessive occlusion by players.

Entering or exiting a camera's field of view by any combination of pan, tilt and zoom operations.

Any combination of the above mentioned mechanisms.

Therefore, in practical situations, a continuous replacement of billboards, is not possible. Even if an interrupted replacement was allowed, it would require a delay of at least a few seconds to decide whether the resulting replacement interval is acceptable or not. Such a delay is usually not permitted in live broadcasting of sports events.

Replacing arbitrary billboards introduces further problems. A seamless replacement requires to identify the foreground objects occluding the billboard in order to inhibit replacement at places of occlusion. Foreground objects mainly consist of players but also the ball or other objects. Consider now a player with a red shirt, occluding a part of a similarly red portion of a billboard. Colour contrast cannot be used robustly to identify occlusion. Furthermore, since the player is a non-rigid object, motion or shape information cannot be used accurately enough to guarantee perfect replacement.

Another problem which may arise in practical situation is resolution of billboard identity. Consider two identical billboards positioned at two different locations in the arena. Suppose different replacement billboards are assigned to each of these physical billboards, then one must be able to tell which one is which. This can prove to be extremely difficult especially if no unambiguous features are visible.

SUMMARY OF THE INVENTION

This invention described a robust system foe billboard replacement, based on some or all of the following key elements:

Pan, tilt, zoom and focus sensors attached to the camera, which enable after a proper set up procedure to estimate the presence and location of billboards in any given video field.

Image processing methods and their embodiment which enable to refine the sensors' estimates.

Physical billboards which are coloured properly to enable the efficient detection of occlusion by chroma-key techniques.

Colour variation or a pattern within the physical billboard for further enhancing the performance of the image processing methods.

The present invention has a first object to provide a method and apparatus which enables identification of the location of a billboard or other static object in a stadium or other venue in any weather conditions with any panning speed of the camera and with any other change in camera parameters.

The present invention therefore provides apparatus for automatic electronic replacement of a billboard in a video image including an automatic camera orientation measurement apparatus including motion measurement means operative to measure the Field of View (FOV) of the TV camera relative to a known reference position.

The present invention also preferably provides apparatus for automatic electronic replacement of a billboard in a video image, including image processing means for processing video signals generated by the TV camera, in which said processing means includes calibration means for periodically automatically calibrating the motion measurement means, apparatus in which the motion measurement means includes means for measuring the pan tilt, zoom or focus of the camera relative to known reference positions and apparatus in which the motion measurement means includes means for measuring the pan tilt, zoom and focus of the camera relative to known reference positions.

The present invention therefore uses dynamic recalibration to correct for residual sensor errors or abberations in an imperfect model and for sensor drift over time. Thus it is possible in accordance with the present invention to use less stable sensors and the apparatus and method in accordance with the present invention can accommodate movement in the camera position. The image correction process for calibration of the sensors eliminates the necessity to keep the sensors stable by mechanical means by recalibration automatically with reference to the video image.

In the initial set up procedure corrections can be incorporated for calibration for billboards which are, for example, not in the centre of the Field of View—for example a billboard which is in the top left-hand corner of the screen can be adjusted by, for example, 3 pixels to take into account abberations in the camera.

Further problems which arise in the prior art systems are firstly when the billboard is either substantially totally occluded or secondly, is occluded by an object, such as a player, of the same colour as the real sign on the billboard.

This can firstly, as explained above, lead to non-recognition of the billboard and also secondly, to difficulty in satisfactory replacement of the billboard.

In the first case the real billboard can have already been replaced in the video image but if the camera zooms into a close up or if a different camera is used for the close up then the lock may be lost due to only a very small portion of the billboard being in view. In the second case the player may have on a strip which is the same colour as the billboard. The prior art systems propose to distinguish the billboard from the player on the basis of movement if the colours are the same and to analyse the "moving" pixels to determine occlusion. This is reasonable in theory but fails in practice since not all payers are moving at all times. Thus, if a number of players move in front of a billboard and one player remains after the others have moved on, the electronics will not be able to distinguish on movement grounds. Since colours are distorted by floodlighting, shadows, differences in reflectivity and different lighting conditions for a foreground player and a background billboard, there will be occasions in practice where the system fails. In such cases either the original billboard may re-appear on the video image or the replacement billboard will not be accurately occluded.

It is again possible to introduce a delay in the video transmission to enable the electronic signal processing to be more accurate but this does not solve the practical problem where a plurality of players move in different directions to occlude a billboard. The necessary delay is considered unacceptable and will in any case not solve all of the above problems.

In accordance with a preferred embodiment of the present invention it is proposed to replace the real billboards with chroma-key panels or with delineated areas forming chroma-key panels.

Chroma-key is essentially an occlusion technique allowing, for example, a news reader to stand and move about in front of a chroma-key board, usually coloured blue or another suitable colour. The news reader (foreground) is distinguished from the chroma-key board (background) by colour differentiation and can thus move in front of the replacement background with normal occlusion of the foreground and background. This technique is very well known in television studio systems and is described in numerous US patents, including U.S. Pat. Nos. 2,974,190 and 4,200,980.

Recently, several systems which combine camera sensors with chroma-key for the purpose of coordinating the movement of the graphics backgrounds with those of the camera, have been described and demonstrated.

(Ref. K. Haseba et al., Real-timing compositing system-of a real camera image and a computer graphic image, International Broadcasting Convention, Sep. 16–20 1994, Conference publication No. 397, IEE 1994, pp. 656–660).

In principle, such an arrangement could be used for billboard replacement where the sensors unambiguously solve the recognition problem and the chroma-key billboard helps to handle occlusion properly. However due to some major differences, this arrangement should be enhanced. These enhancements are the basis of the present invention.

In a virtual set application, the camera is typically 2–10 metres away from the foreground and the entire field of view is usually replaced. In comparison, a billboard may be several hundred metres from the camera and therefore a replacement system using sensors is much more susceptible to sensor errors:

Due to the large focal distances, the same sensor accuracy will translate to larger geometric registration errors.

Consider a rotary encoder of 81000 pluses/revolution, then the angular precision is 0.0044 degrees or 75 micro-radians. The repeatability is twice as bad. Consider a shooting range of 100 m with a field of view of 4 metres, then the FOV is 40 milli-radian. The error translates to 768*? 150/20000=2.88 pixels.

Since the field of view includes many stationary objects (including billboards) which are not replaced, the human observer will be much more sensitive to the registration errors. Additional errors may originate from lens distortion, rotation axis which does not pass through the focal point, non-zero roll angle, etc.

Chroma-key is basically a technique for studios where the illumination is carefully designed and controlled and the controls of the chroma-keyer are carefully adjusted for the specific arrangement of blue-screen colour and illumination.

In a sports event, the conditions may be highly non-ideal and require some modification to the chroma-key algorithms. In particular, the keyer parameters should be adapted to the specific billboards being replaced due to changes in illumination across the arena.

Accordingly in the present invention it is proposed to use chroma-key panels and to replace these in the video image by the replacement billboards.

Since it is necessary for perfect occlusion that the players or other occluding objects are of different colour to the chroma-key panels, it is proposed in a further preferred embodiment to provide chroma-key panels in which the colour of the panel may be changed, for example, by using a rotating billboard structure which is known in the art. One side could, for example, be blue and another green. Green may be preferable in a sports environment since players tend not to wear green as this would not contrast with the background sports surface.

In a further preferred embodiment and in particular where a plurality of billboards require replacement, a patterned chroma-key board is used. The pattern may be of any suitable shape but is preferably selected to be suitable for the size and shape of the billboard or series of billboards and also to the anticipated video conditions. Thus if a billboard is only able to be viewed from a long distance then a different pattern will be selected to a billboard which is to be viewed in close up The pattern may comprise different colours or may be different shades of the same colour. The pattern may comprise vertical and horizontal lines or may comprise a decorative pattern, a discernible advertisement, company logo or other suitable wording which may be more aesthetically acceptable.

The use of a pattern allows further discrimination of the position of the camera and may allow movement of the camera from a fixed position.

The camera orientation data can be transmitted together with the video signal and will identify the position of the billboard in any weather, lighting or occlusion conditions. No reference is required to any feature within the sports venue to identify the position of the billboard.

The camera sensors can be accurate to a few pixels or in physical terms to approximately 1 cm at a range of about 100 metres thereby enabling accurate replacement of any billboard. The recalibration can be carried out continuously or only periodically, particularly if an initial adjustment of the calibration of billboards not in the centre of the FOV is recorded on set up.

By use of the chroma-key techniques there is no requirement to transmit any occlusion data since this can be readily inserted at a receiver and the occlusion inserted in the normal manner.

In a preferred arrangement within a stadium or other sports venue real billboards with normal advertising material will be situated on one side of the stadium to be viewed by a first plurality of cameras and chroma-key billboards will be situated on another or the opposite side to be viewed by a second plurality of cameras. This, for example, the home nation may view the normal billboards, with the international TV audience seeing only substituted boards.

The present invention also provides a method for electronically replacing a billboard in a video image display, generated by a camera, comprising the steps of:

a. identification of the position of a rectangular billboard in a stadium or other venue, said identification step comprising specifying on the video display the billboard to be replaced by identification of its four corners at a first camera position;

b. storing the identification information;

c. monitoring the movement of the camera in pan, tilt and zoom;

d. storing the monitored movement of the camera on a field by field basis; and e. analysing the size and position of the billboard to be replaced from the information recorded in its first known position and the stored movements of the camera to provide information relating to the size, perspective and position of the billboard in the present video field;

f. storing in a billboard replacement store a replacement billboard to be used in replacement of the billboard in the stadium;

g. electronically altering the size and perspective of the replacement billboard in accordance with the camera motion information to conform to the size and perspective of the billboard to be replaced in the present video frame; and h. electronically replacing the billboard in the present video frame by the replacement billboard.

In a preferred embodiment the step of analysing the size and position of the billboard to be replaced comprises a further step of analysing a plurality of video scan lines to provide fine adjustment information relating to the exact size, perspective and position of the billboard to be replaced.

In a further preferred embodiment the billboard to be replaced is blank and is of colour suitable for chroma-key replacement. Such colour may be of a blue or green shade, due to the fact that these colours are rarely found in human skin and hair.

In a still further preferred embodiment the chroma-key billboard is patterned with a pattern of a suitable shape for the purpose of facilitating the fine adjustment process mentioned above. The step of analysis of the size and position of the billboard comprises the analysis of the pattern to ascertain the exact position of the billboard.

In a further embodiment the correction of the sensor-based prediction by the analysis of the pattern will be controlled by a figure of merit (accuracy estimate) for the analysis, which will be computed automatically.

In a further embodiment the step of electronically replacing the billboard in the present video field by the replacement billboard include the step of superimposing occluding objects by use of the chroma-key techniques.

In a further preferred embodiment the billboard to be replaced can be changed to best match the colours and shades of colours on the players costumes, for the purpose of providing a good contrast between the billboards and the players. For example, if these costumes contain shades of blue, then a green billboard may be selected.

The backing colour can be selected between blue, green and red. In order for the chroma-keyer to calculate all parameters necessary to perform proper image compositing, the system requires a sample of the background colour as reference. This step can be done automatically by scanning the image and detecting the purest and brightest colour. Advanced chroma-keyers enable the user to manually select the area to be sampled.

In a further preferred embodiment the chroma-key apparatus will have a multiplicity of set up conditions, each corresponding to a different region of the stadium. The camera pan, tilt and zoom information will allow to load the corresponding set up conditions.

In a further embodiment, the fine adjustment information will be used to compensate drift errors of the sensors. In a practical situations, the sensor error will have a significant portion which is at temporal frequencies which are much lower than the video field rate. Thus these sensor-induced errors can be reliably estimated from good video field and subtracted from subsequent measurement.

The present invention also provides apparatus for carrying out the method of electronically replacing the billboard as specified hereinbefore.

BRIEF DESCRIPTION OF THE DRAWINGS

Embodiments of the present invention will now be described, by way of example with reference to the accompanying drawings in which:

FIG. 1 shows a stadium or other venue illustrating the apparatus according to the present invention;

FIG. 2 shows the video image of the stadium as seen by the camera in a first position;

FIG. 3 illustrates a stadium with billboards in several different positions;

FIG. 4 illustrates a zoomed camera shot of a billboard illustrating the problem with prior art systems;

FIG. 12 shows an arrangement for camera intrinsic parameters store;

FIG. 13 shows equations for dynamic recalibration;

FIG. 20 shows an alternative arrangement for the billboard set up data store illustrating an alternative embodiment;

Figure 5:
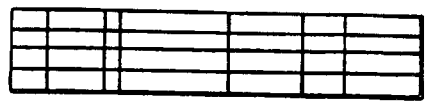
FIG. 5 shows a patterned chroma-key billboard for use with the present invention.

With reference now to FIGS. 1 to 4 the principle of the present invention is now explained.

DETAILED DESCRIPTION OF THE PREFERRED EMBODIMENTS

In a stadium or other venue 10 billboards 14, 16, 18 are installed at the side of a pitch represented by markings 12. These billboards are viewable by camera 20. Billboards 15,17,19 may be present on the opposite side of the stadium for viewing by a further camera 21. The stadium terraces/seating are shown diagrammatically by the lines 11.

Camera 21 may in a preferred example be a normal TV video camera and will transmit its output video signal directly to a first feed which may serve the local population. Although we refer to camera 20 or 21, it may be clearly understood that there could be a plurality of cameras on each side of the stadium providing differing views.

Camera 21 in a preferred embodiment will televise boards 15,17,19 which will be transmitted to the local population in an unchanged manner.

Camera 20 will in this preferred embodiment transmit a feed to an international audience. Camera 20 is equipped with orientation sensing means which preferably comprises one or more of the following pan measurement means 24;

tilt measurement means 25;

zoom measurement means 26; and focus measurement means 28.

Suitable sensors may comprise the Virtual Reality Encoder from RADAMEC EPO, Bridge Road, Chertsey, Surrey KT16, 8LJ, England.

Dependent on the allowed mobility of the camera only one, several or all of these may be required. For example, if camera 20 is fixed in pan and tilt and focus and can only zoom, as in the case of some remotely controlled unmanned cameras then only the zoom parameter need be measured.

Most cameras in sports stadiums can zoom, tilt and pan and it is assumed that these parameters are measured for each camera as now explained. The focus is assumed to be fixed but in similar manner the parameter could be added if required.

Figure 7:
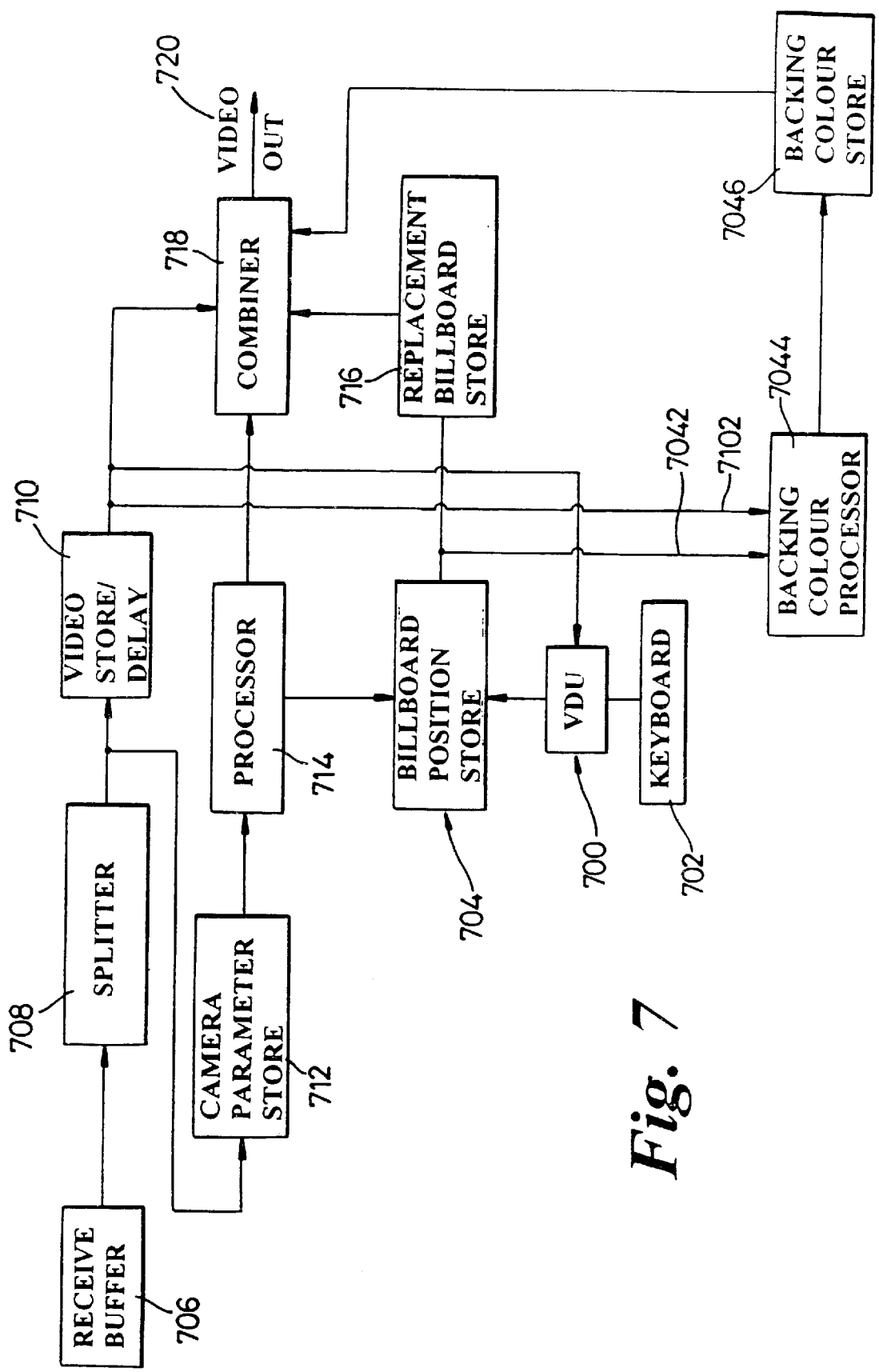
FIG. 7 shows in block diagrammatic form receiver circuitry for co-operation with the transmitter circuitry of FIG. 6.

FIG. 2 shows the video image as seen by a viewer and in particular by the operator of the equipment. The camera 20 is zoomed, panned and/or tilted to "centre" the billboard 14 in a suitable position and at a reasonable size. With reference to FIG. 7 each billboard is then viewed at a receiver and its position is marked preferably by using a touch screen 700, or keyboard mouse 702 and marking the four corners. The positions are stored in a store 704.

For billboards higher in the stadium such as 30 (FIG. 3) a correction factor for the camera may be stored dependent on the tilt position of the camera.

Each billboard position is stored in store 704 together with the camera parameter information at the reference position for the camera 20 obtained from the camera parameter information which is correct at the time that the billboard position is stored.

The following procedure is preferably repeated for each of the cameras and for each of the target billboard:

1. Point the camera at the target to obtain a stable unoccluded view of the target. Adjust the zoom to get a large view of the target yet keeping the whole target within the field of view.
2. While the camera is not moving trigger an acquisition device, to grab a picture of the target, as well as the corresponding readings of the sensors.
3. Mark the corners of the target, on the video image.

Preferably a corner detector is used to pinpoint the corners of the target at sub-pixel precision.

This camera parameter information is obtained (FIG. 6) from the sensors mounted on the camera and the camera movement is referenced to a first or fixed reference position for each parameter. The movements of the camera are sensed and the signals are fed into a combiner circuit 34 and then to a transmit buffer 36 from which the combined video and position data signals are transmitted.

During set up, at the receiver (FIG. 7) the receive buffer 706 receives the signals and feeds these to a splitter 708. The video signal is stored and delayed in a suitable store 710 and the camera parameter data is extracted and stored in store 712.

In set up the VDU 700 is used to mark each billboard that may require replacement. The camera 20 is panned etc to move each billboard into a suitable position on the screen and its position is recorded in the billboard store 704 together with the camera parameters obtained from store 712 via processor 714.

A replacement billboard store 716 stores a plurality of replacement billboards and these are selectable to be able to replace the original billboard.

The replacement billboard is in operation inserted into the video signal in a combiner 718 to provide a modified output video signal 720.

Figure 6:
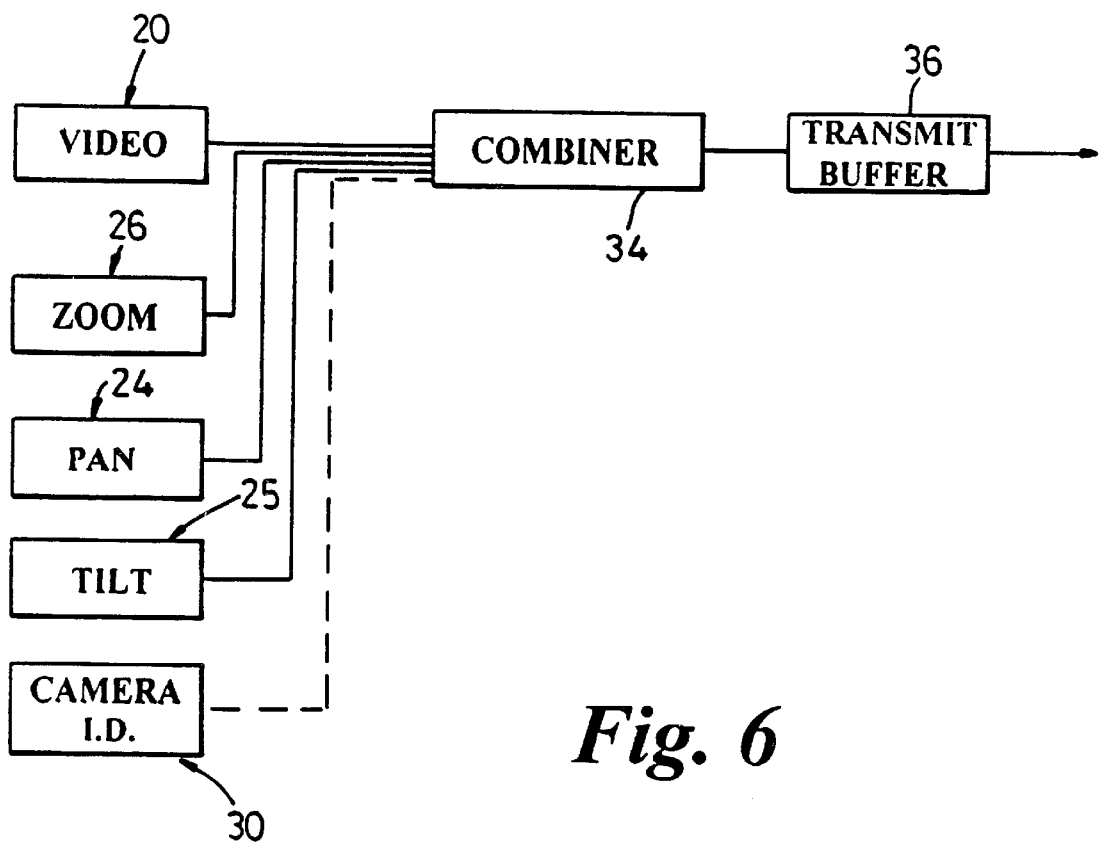
FIG. 6 shows in block diagrammatic form circuitry associated with the camera arrangement of FIG. 1 for transmitting video data and camera orientation data.

The setting up procedure can also identify billboard locations and camera parameters for several cameras by storing a camera ID from a source 30 (FIG. 6). Thus, billboard position store 704 will store separate lists of billboard data for each camera.

The operation of the system will now be described with reference to a single billboard and a single camera 20.

With reference to FIG. 4, it is assumed that billboard 14 enters the field of view in an enlarged form on the left-hand side of the screen as camera 20 pans following zooming from the FIG. 3 position.

The camera orientation data is constantly being received by the receiver and the processor 714 will constantly match on a pixel by pixel basis the video image with the known billboard position stored in store 704. As soon as the billboard appears in the video image the pixels representing the billboard will be identified and the replacement billboard pixels which relate to those pixels will be substituted in the combiner 718. The delay will be minimal since the identification of the pixels is by an address correlation process which will be virtually instantaneous.

After a period of time the camera sensors may drift and in this case the replacement billboard may not exactly align with the original. This may only be by one or two pixels and may not be discernible to the viewer. To correct this two solutions are possible. Firstly, the billboard position can be manually restored periodically at a suitable time, for example, when a camera is not active. This requires the co-operation of the operator.

Secondly, a comparison can be made on a pixel by pixel basis of the billboard against an original stored billboard and an adjustment of the reference camera parameters can be made in billboard position store 704. This process can be done automatically at either set intervals or when the processor 714 has a suitable time slot.

The essential steps of a preferred recalibration process are to perspectively transform the current video image using the camera data to provide an estimated transformed model. A stored image of the billboard is then compared with the transformed model to provide a residual video field. The residual distortion between the transformed model and the residual video field is resolved to provide updating information for updating the estimated transformation and to thereby provide a calibration correction factor for recalibrating the position of each billboard in the store in accordance with the camera sense information.

The replacement of each billboard is accomplished by use of the processor 714 (FIG. 7) and the various parameter and billboard stores using appropriate software programmes as now described in more detail.

Figure 8:
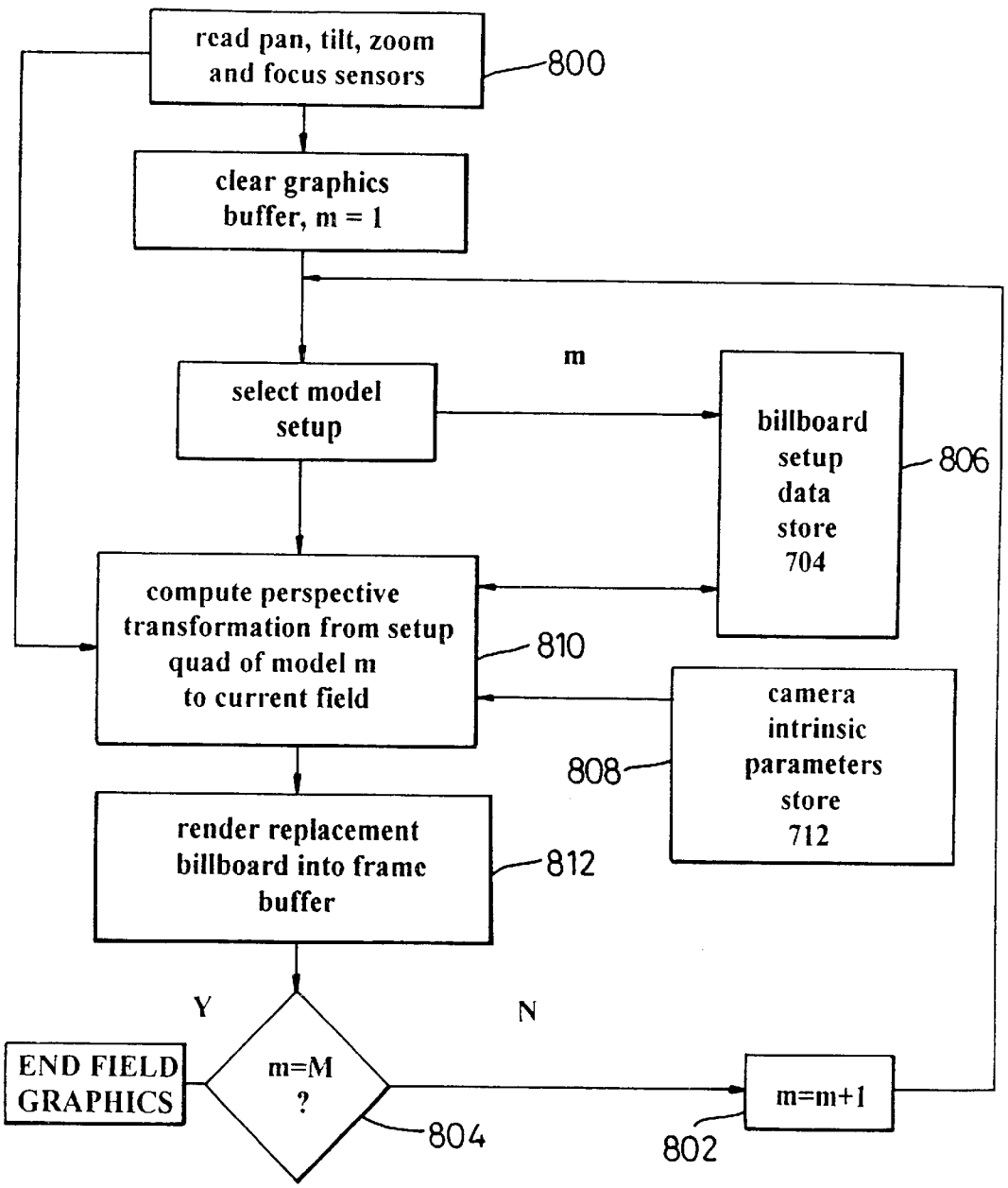
FIG. 8 shows a flow diagram for the operation of the circuitry of FIG. 7.

FIG. 8 describes the complete process which allows to determine the position of each billboard in the camera's field of view, and render the corresponding part of the billboard into the frame buffer. Since the rendering and later the compositing of the graphics buffer with the video buffer by means of chroma-key are known art, we will concentrate on the billboard position determination with reference also to FIGS. 6 and 7.

At the beginning of each video field, the pan, tilt, zoom and focus sensors (24,25,26) are read 800. These values, combined with billboard data from billboard setup data store 704 and camera data from camera intrinsic parameters store 712, enable the detection and recognition of all billboards in the camera's FOV, independently of the video signal. The processing of FIG. 1 consists of a loop on all billboards (m) 802,804. For each billboard, its setup data is retrieved 806 from billboard setup data store 704 and used with camera intrinsic parameters 808 to compute the perspective transformation 810 from billboard m to current field. The replacement billboard information is then stored (812) in a frame buffer.

Figure 9:
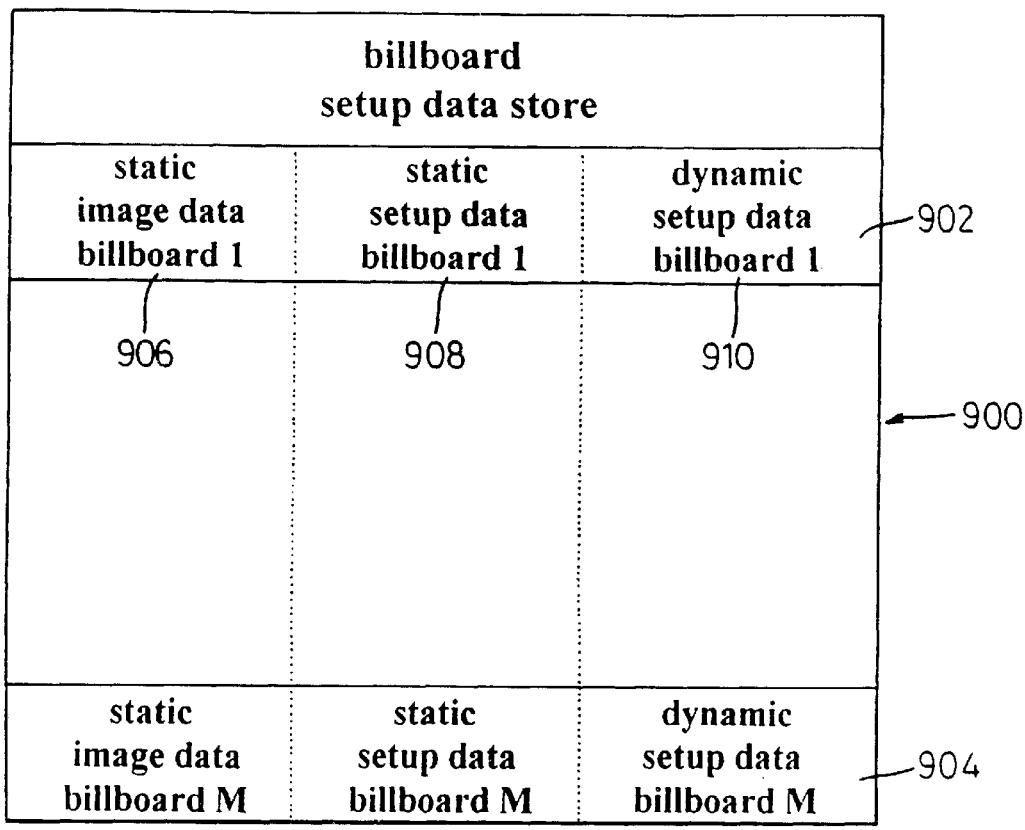
FIG. 9 shows an arrangement for a billboard setup data store.

FIG. 9 describes the billboard setup data store 900 which consists of a separate record 902 . . . 904 for each billboard in the arena. Such a record consists of a static image 906 grabbed in favourable conditions and of the corresponding static setup data 908. The record also consist of dynamic setup data 910 which is computed using the image processing means in a process known as dynamic re-calibration which has been briefly described above and will be further described with reference to FIG. 11. An alternative procedure providing static and dynamic calibration is described with reference to FIGS. 20, 21 and 22.

Figure 10:
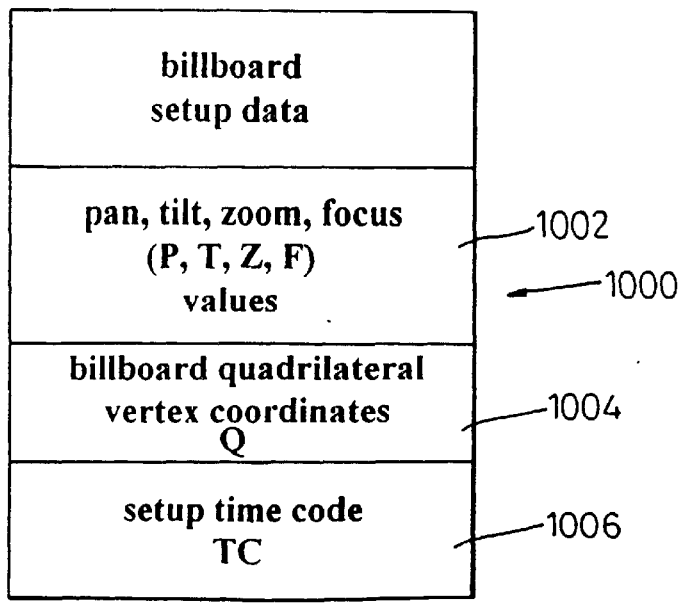
FIG. 10 shows an arrangement for billboard setup data.

FIG. 10 describes the setup data (either static or dynamic) 1000 for a single billboard. It consists of the sensors' readings 1002 at the setup instance, the billboard quadrilateral vertex 1004 coordinates and the time-code of the setup instance 1006.

The method of dynamic re-calibration can be explained as follows:

Due to sensors' drift and inaccuracies, a final calibration table and other practical reasons, it is impossible to predict the exact location of all visible billboards at a given instance. However, at many video fields, a billboard's visibility may be such that an exact geometric position correction can be performed. Since that position is closer both temporally and spatially to the subsequent video fields, it is preferable to rely on that "luck shot" by predicting the billboard position relative to its sensors' readings and exact quad coordinates. Consider for example a billboard which exit s the field of view due to camera panning. Having a luck shot while it is still highly visible, allows the smooth tracking of the billboard by sensors only, when its visibility does not allow any image processing means to be applied.

Figure 11:
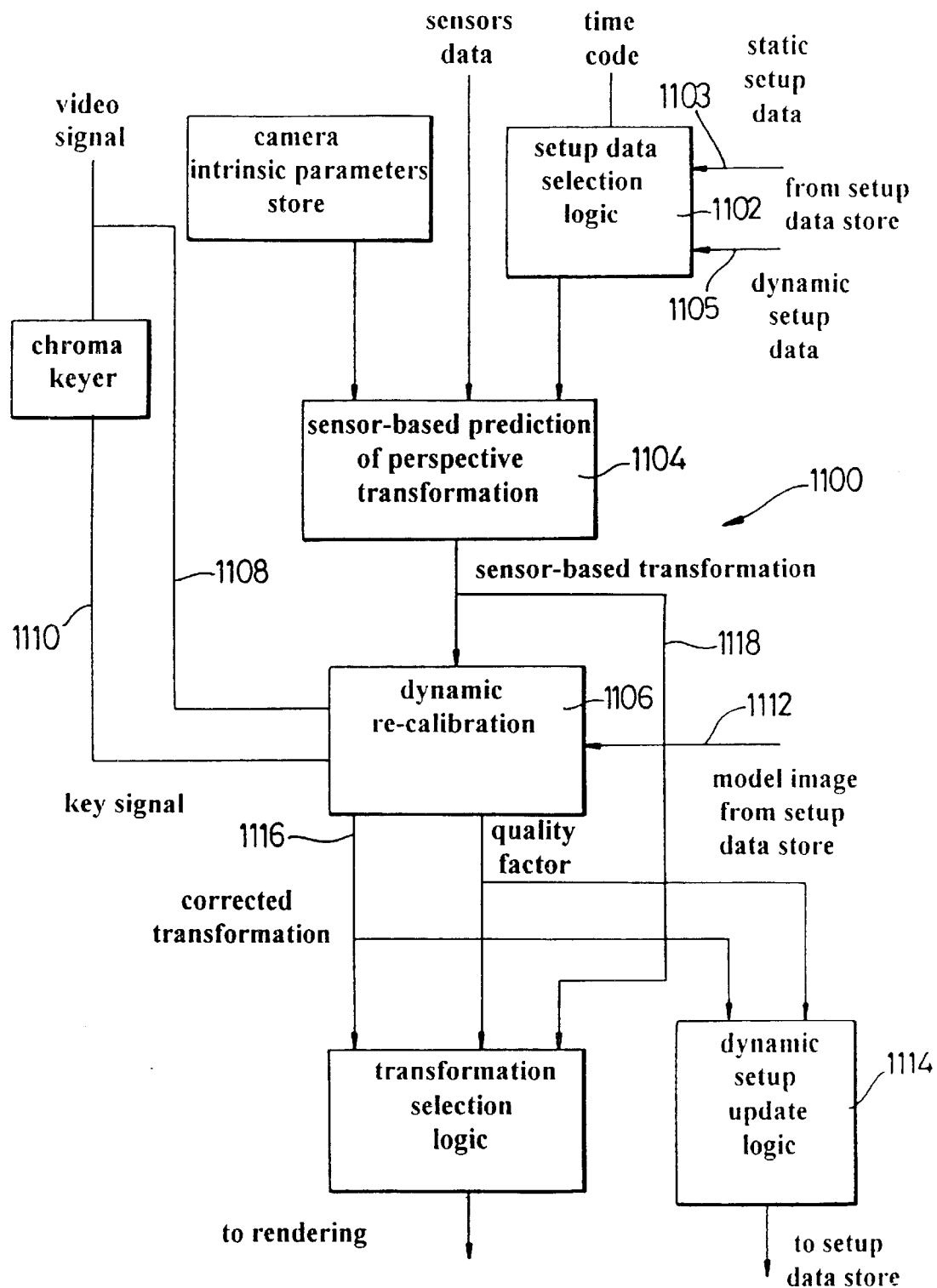
FIG. 11 shows a flow diagram for perspective transformation computation.

FIG. 11 depicts the flow diagram 1100 for perspective transformation computation. A setup data selection logic 1102 selects either the static 1103 or the dynamic 1105 setup data from the setup data store 806 as described above. This setup data, together with camera intrinsic parameter is use to compute a sensor-based prediction of the perspective transformation 1104, independently of the video signal.

A dynamic re-calibration 1106 based on image processing means is then applied to the prediction. It utilizes the video 1108 and chroma-key 1110 signals as well as the billboards model image 1112 from the setup data store 806 (FIG. 8). Based on a quality factor derived from the image processing means, either the sensors-based 1118 or the corrected transformation 1116 are output. If the estimated quality of the geometric correction is high, then the dynamic setup data is updated 1114.

Figure 14:
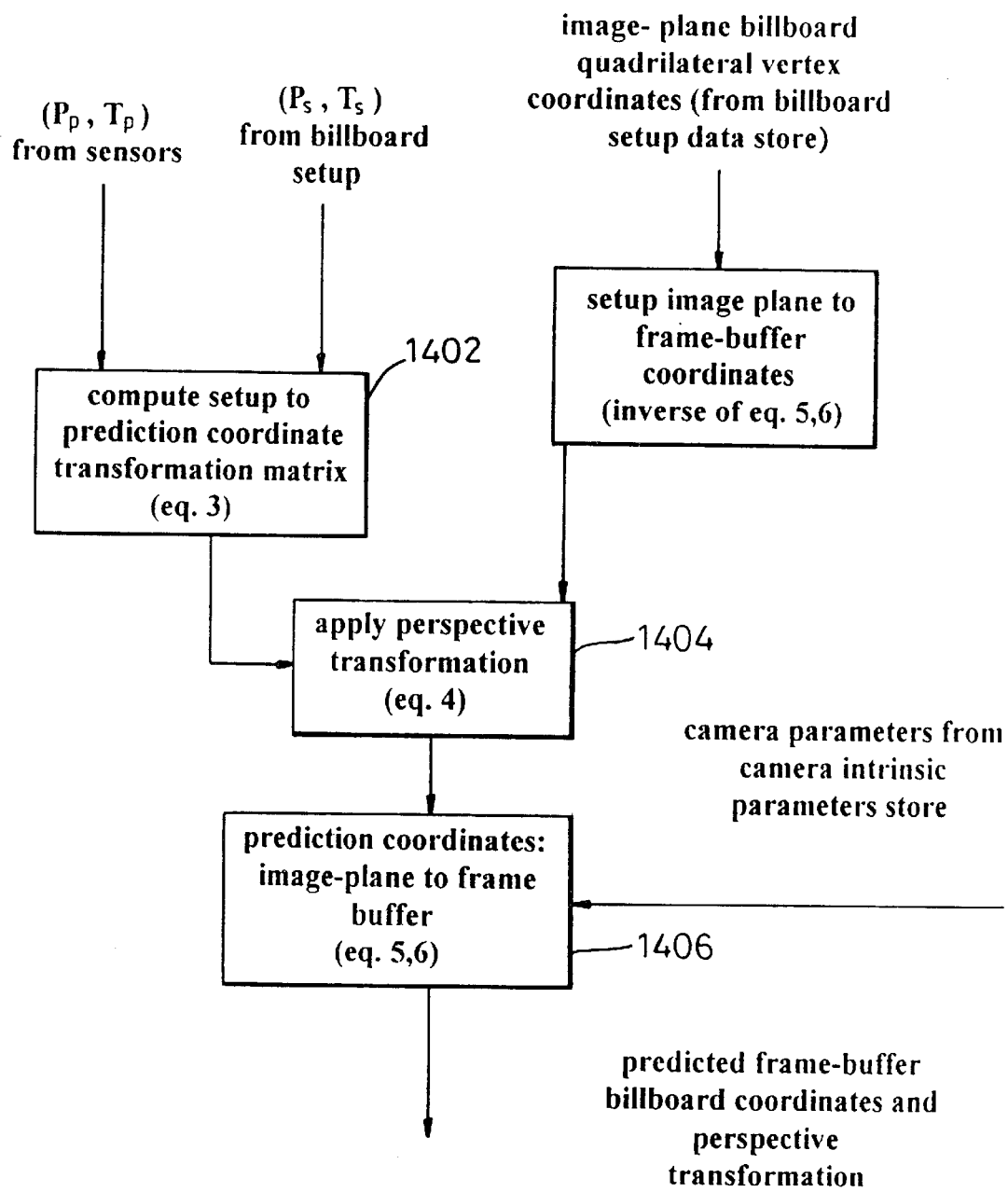
FIG. 14 shows a flow diagram for dynamic recalibration.

FIGS. 12,13,14 describe the sensor-based prediction of billboard coordinates in the video field. Such a prediction utilizes the sensors reading as well as the camera intrinsic parameters. These parameters are described in FIG. 12 and have to be tabulated for a dense sampling of the (zoom, focus) space. The meaning of these parameters is clear from FIG. 13 to which reference is now made.

Let the set of measurements given by the pan, tilt, zoom and focus sensors be represented by the vector (P,T,Z,F). The tilt angle is assumed to be relative to the horizon.

Consider an object point whose image at some setup instance is, at frame-buffer coordinates $(x_s, y_s)$. Let also the sensor measurement vector at that instance be $(P_s, T_s, Z_s, F_s)$.

At another instance, the prediction instance, let the sensor measurements vector be $(P_p, T_p, Z_p, F_p)$. It is required to predict the location of the object point in frame-buffer coordinates (possibly out of the actual frame-buffer), $(x_p, y_p)$.

To enable the procedure we define the setup rotation matrix as shown at 600 and the prediction rotation matrix is defined as shown at 602.

Then, the perspective transformation matrix between the two image-plane coordinate systems is given as shown at 604 and 1402 (FIG. 14).

$R_{sp}$ is a 3*3 matrix with row and column indices ranging from 0 to 2. $R_{sp}[i][j]$ denotes the term in row i, column j in the matrix. Thus, given the setup image-plane coordinates of the object point ($u_s$, $v_s$), the predicted location of the object point in image-plane coordinates ($u_p$, $v_p$) is given as shown at 606, 1404.

Image-plane to frame-buffer coordinate transformation is achieved as shown at 608, 1406. Aberration compensation is achieved as shown at 608, 1406 (FIG. 14) to provide predicted frame buffer billboard coordinates and perspective transformation data.

Figure 15:
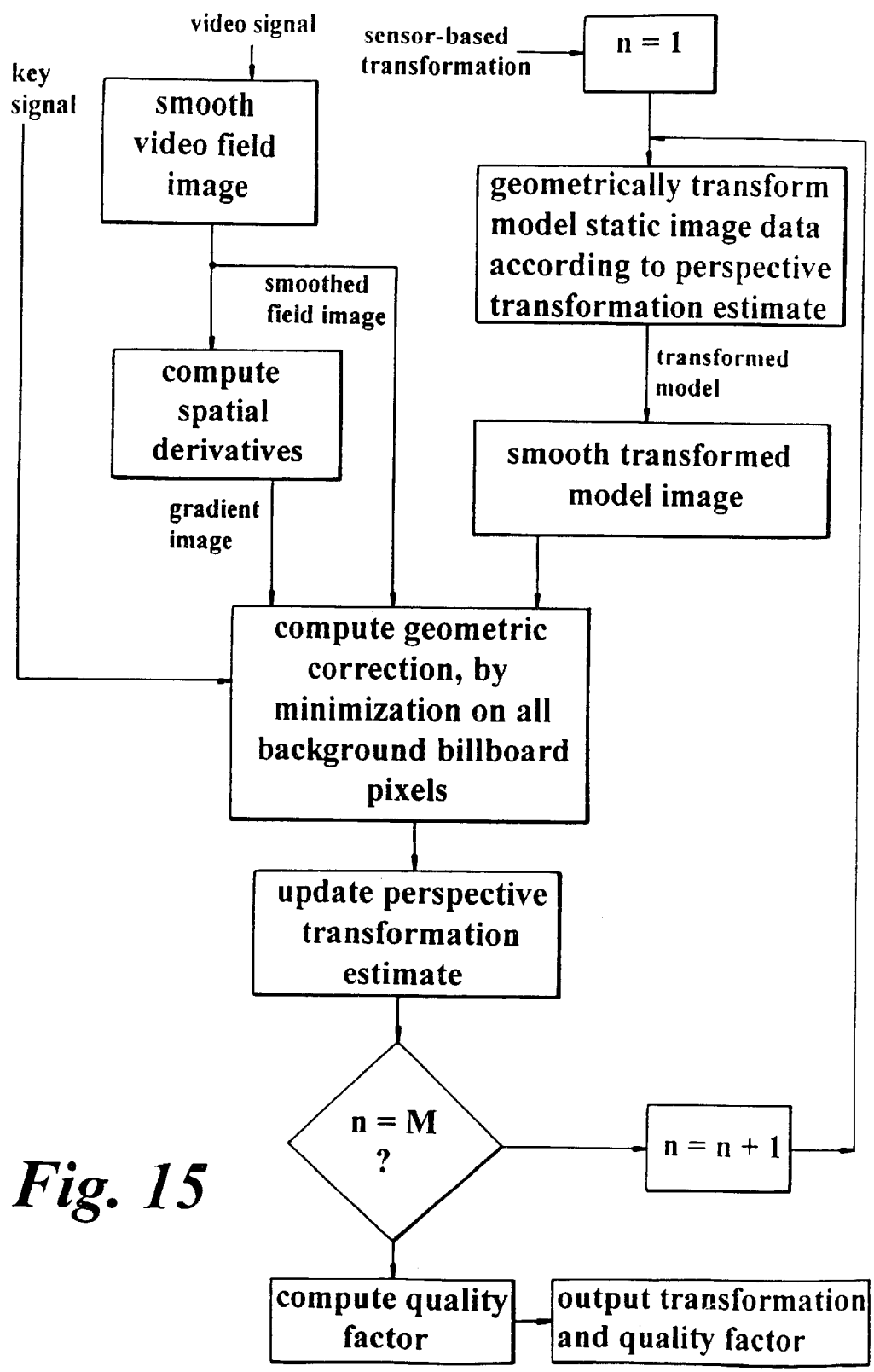
FIG. 15 shows the process of recalibration.

An effective way of deriving these parameters for a specific (zoom,focus) pair is described in [J. Weng et al., Calibration of stereo cameras using a non-linear distortion model, IEEE 10th Intl. Conf. Pattern Recognition (1990), pp. 246–253]. The image processing means for geometric correction, which allow also the process of re-calibration, is now described with reference to FIG. 15.

The image processing means for geometric correction of sensors-based prediction are based on the differential method for motion estimation [C. Cafforio and F. Roca, The differential method for motion estimation, in: T. S. Huang, eg., Image sequence processing and dynamic scene analysis, Spring, Berlin, 1983, pp. 104–124]. Let C be the current video field and let M be the static billboard setup image, perspectively transformed according to the sensors-based prediction. Here we consider only luminance images. Ideally, M and C are identical within the support of the billboard quadrilateral. Actual differences may include:

Occlusion present in C but not in M.

Geometric errors due to sensors and intrinsic camera parameters errors.

Luminance changes.

Neglecting for the moment any difference which is not due to geometric errors, consider a point (x,y) inside the support of the billboard quadrilateral. Let (p,q) be the local geometric error then we may write for the luminance signals of the respective images:

$$M(x+p, y+q) = C(x,y)$$

Under the assumption that the error is small, one may write a Tailor series expansion:

$$M(x+p, y+q) = M(x,y) + p\frac{dM}{dx} + q\frac{dM}{dy} + (\text{Second order terms})$$

Neglecting the second order terms and denoting the spatial derivatives $$dM/dx = H$$
$$dM/dy = V$$

we obtain $$C(x,y) - M(x,y) = pH + qV$$

Also denoting the differences C(x,y)–M(x,y) by D we obtain $$D = pH + qV$$

The equation above holds, locally. For a global billboard solution, and small error assumption we may use the perspective model [G. Adiv, Determining Three-Dimensional Motion and Structure from Optical Flow Generated by several moving objects, IEEE Trans. Pattern Analysis and Machine intelligence, 7, pp. 384–401, 1985].

$$p(x, y) = \frac{a_1 x + a_2 y + a_3}{a_7 x + a_8 y + 1}$$

$$q(x, y) = \frac{a_4 x + a_5 y + a_6}{a_7 x + a_8 y + 1}$$

The coefficients a1, ..., a8 are computed by minimizing the following expression:

$$\sum_{(x,y)} (D(x,y) - p(x,y)H(x,y) - q(x,y)V(x,y))^2$$

Now, the perspective transformation matrix (based on sensors' prediction) is multiplied by:

$$\begin{bmatrix} a_1 & a_4 & a_7 \\ a_2 & a_5 & a_8 \\ a_3 & a_6 & 1 \end{bmatrix}$$

The matrix obtained can be considered to be the updated prediction of billboard perspective. In a practical environment the following considerations may apply.

Occlusion may cause major problem in this formulation, since if pixels from occluding and moving objects participate in the minimization of the expression above they might bias the solution significantly. Preferably, such pixels are discarded from processing by using chroma-key panels. A key signal output by a chroma-keyer, is preferably utilized to discard these pixels.

Luminance variations can be minimized by pre-processing the current video field, using histogram matching techniques.

The prediction-correction process may require 2–3 iterations to converge.

Noise immunity and convergence can both be enhanced by pre-smoothing the images.

Thus the billboards 14 etc are in accordance with the present invention chroma-key boards and occlusion is by colour discrimination using the normal chroma-key techniques. These techniques will enable perfect occlusion providing that the players do not wear any colour which is the same as the board. This may not always be possible and it is proposed in accordance with a particular embodiment of the present invention to use boards which can rotate or otherwise change to a second or third colour. For example, three colours may be blue, green and red which may be selected when the colour of the players strips are known.

Alternatively if it is required to display a billboard in an area of the pitch or a surrounding area then such an area must be selected to be of a known colour which can then be recorded in the chroma-keyer as a chroma-key colour.

In a preferred embodiment chroma-key apparatus can comprise the ULTIMATTE-7 digital video image compositing device from ULTIMATTE Corp., 20554 Plummer St., Chatsworth, Calif. 91311, USA.

The backing colour can be selected between blue, green and red. In order for the chroma-keyer to calculate all parameters necessary to perform proper image compositing, the system requires a sample of the background colour as reference. This step can be done automatically by scanning the image and detecting the purest and brightest colour. Advanced chroma-keyers enable the user to manually select the area to be sampled.

In a particular embodiment it is proposed to use a patterned chroma-key panel. Calibration of the camera sensors can then readily be accomplished by comparison of the pattern on a pixel by pixel basis. The pattern on the billboard panel should preferably have critical dimensions less than anticipated sensors error (projected to world coordinates).

In summary, the above system can operate even in extremely poor weather conditions since the electronic processing circuitry knows exactly where each billboard is situated and does not rely on any analysis of the video image to detect the billboard. In the event that the video image is so distorted that recalibration cannot be carried out with reasonable certainty, then the original camera parameter settings can continue to be used since the video image as viewed will be of poor quality and thus the viewer will not notice an error of one or two pixels in the positioning of the replacement billboard which will require to be displayed in an equivalent quality which matches the poor quality video image.

Figure 16:
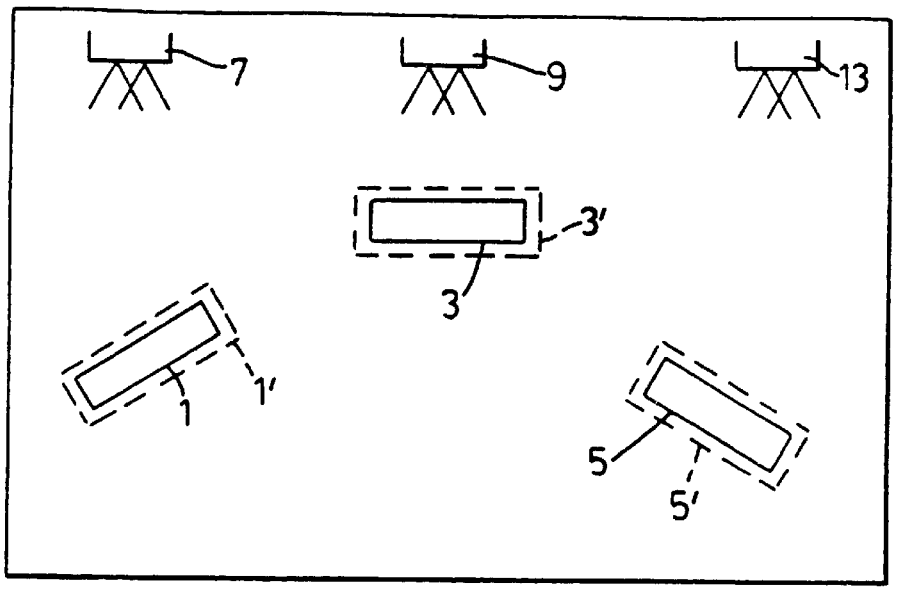
FIG. 16 illustrates the problems relating to siting of billboards at different locations within a stadium with differing lighting conditions.

In a further preferred embodiment of the present invention, the problem addressed is that of having billboards situated in different positions in a stadium as shown in FIG. 16.

In such conditions the lighting of billboards, 1,3 and 5 will be different because of the location of lights 7, 9 and 13. Also this lighting can change all the time during the game.

If such billboards are chroma-key boards all of the same colour then the billboards will all appear to be slightly different colours due to the different lighting conditions.

A fixed adjustment of a global backing colour might result in partial object background separation by the chroma-keyer.

In the present invention it is proposed to provide spatial adaptation of the backing colour map so that the chroma-keyer can correctly recognise each billboard. This can be provided by storing in store 704 (FIG. 7) a spatial map providing information relating to the colour of each chroma key board.

Thus, the chroma-keyer will compare the colour in each video location with a specific colour associated with the billboard in that location.

In a preferred embodiment the locations of the billboards may be identified by "painting" a slightly enlarged box surrounding the billboard to identify the location. Such boxes are identified as 1', 3' and 5" by dotted lines in FIG. 16.

The system will track the backing colours over time and therefore will continuously update, to ensure correct identification, once correctly set up.

The operation of the system is as follows.

Figure 17:
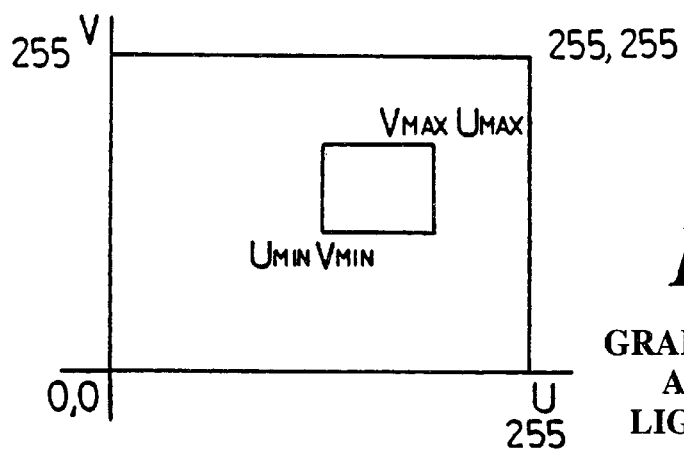
FIG. 17 shows a graph of minimum and maximum levels for U & V illustrating the operation of a chroma-keyer.

Firstly with reference to FIG. 17, minimum and maximum levels are set for U and V. These should be wide enough to encompass all billboards which are reasonably lit.

Figure 18:
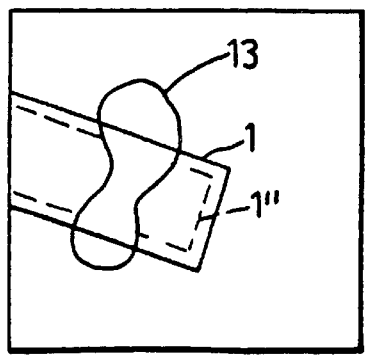
FIG. 18 shows a billboard with occluding object illustrating the principle of adjustment of the chroma-key colour for a billboard.

Then for each billboard, as lighting conditions change, an adjustment can be made to its stored values, as shown in FIG. 18, which assumes occlusion of billboard 1 by an object 13. An inner box 1" is defined to ensure only pixels from within 1 are considered. Most occluding pixels can be discarded as these will be of a different colour. Then all pixels (YuV) inside FOV and billboard quad 1" are measured and an addition to the average (which is backing colour average UV over billboard) is made if:

$U_{min} \leq U \geq U_{max}$ or $V_{min} \leq V \geq V_{max}$

The inventors have recognised a further problem which arises from the use of chroma-key billboards in a stadium. Due to the variable lighting as described above, each billboard will appear on the video image as a slightly different colour. In order to transmit correct occlusion information it is necessary to transmit an occlusion map for each billboard.

In accordance with a preferred embodiment of the present invention it is proposed to transmit, for each billboard, a perfect background colour and to then allow a chroma-keyer in each receiving station to introduce the occluded portions by normal chroma-key procedures.

Consider now the billboard arrangement as shown in FIG. 16. Each billboard 1,3 and 5 will, because of its different lighting conditions, appear to be a different colour even though this colour may be within the maximum and minimum limits as set out in FIG. 17.

In accordance with this preferred embodiment of the present invention, the transmitting apparatus (see FIG. 6) will transmit a perfect chroma-key colour within the area of the billboard and will also transmit the coordinates of the quadrilateral formed by the billboard.

In this way the receiving station only has to decode/extract the quadrilateral coordinates of the billboard and then within that quadrilateral replace those pixels which are the perfect chroma-key colour by the replacement billboard. Those pixels which are not a perfect chroma-key colour are not replaced.

In accordance with this system it is not necessary for the chroma keyer at the remote receiving station to be able to recognise different billboards and to have to store different chroma-key values for each billboard. Also it is not necessary to transmit any occlusion information since occlusion by the chroma-keyer will be relatively simple at each remote location.

With reference to FIG. 7, the billboard position and backing colour store 704 knows the position of each billboard and a control output 7042 from the store is used, in combination with the video output 7102 to provide inputs for a backing colour processor 7044 which can change the colour of the billboard within the coordinates provided by store 704. The output of processor 7044 is used to control a backing colour store 7046 which changes the colour of the billboard within the required coordinates and can also provide the coordinates to the video output 720 for the remote receiver. These may be transmitted by a standard video data transmission system.

Figure 19:
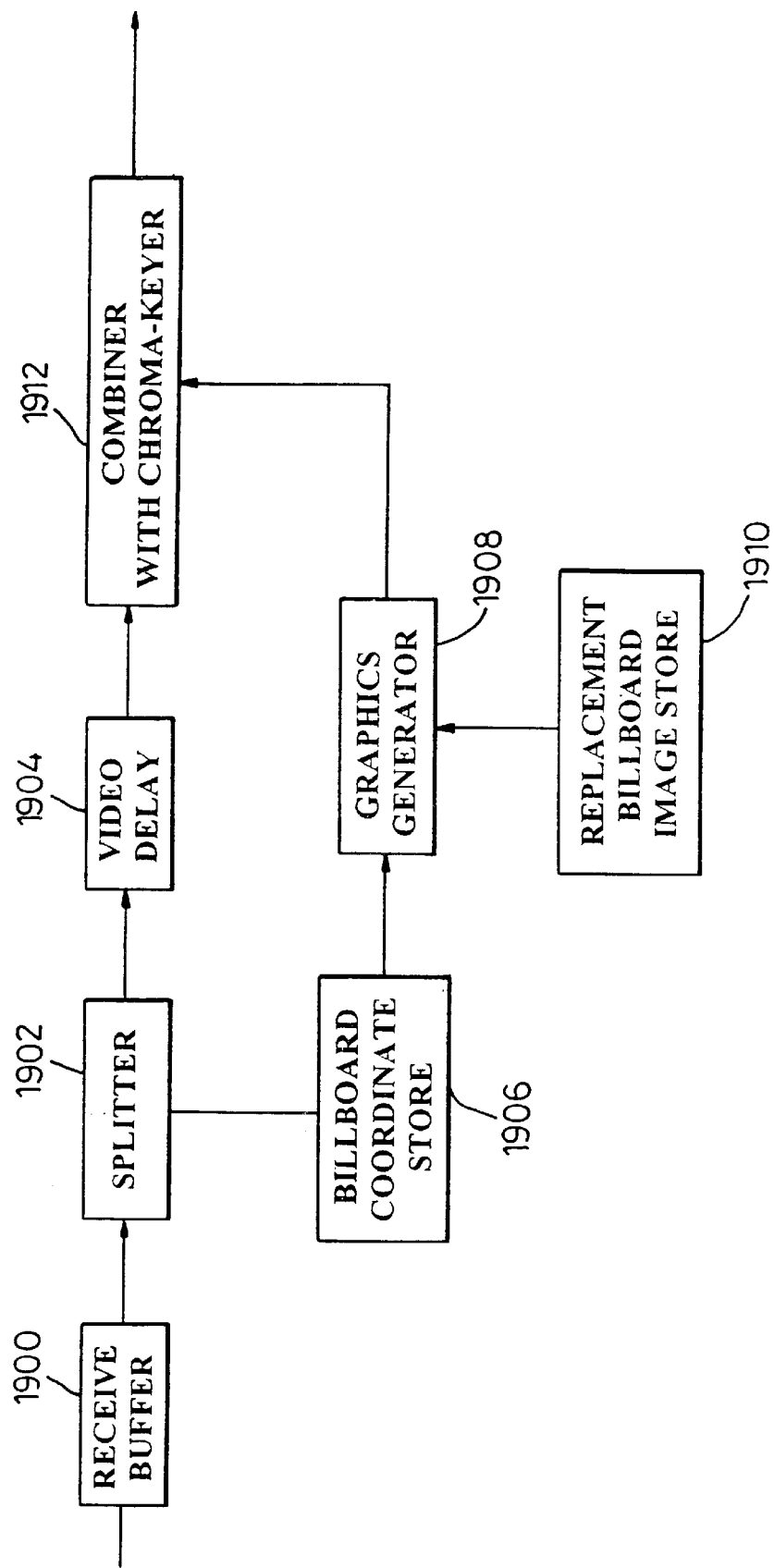
FIG. 19 shows an exemplary remote receiver for reception of billboard coordinate data and perfect chroma-key colour, occlusion being effected by chroma-key techniques.

An exemplary remote receiver is shown in FIG. 19. Video data is received at receiver buffer 1900 and split and delayed 1902, 1904.

Billboard coordinate store 1906 stores the transmitted billboard coordinates and in combination with graphics generator 1908 and replacement billboard image store 1910 provides an output signal to a combiner/chroma-keyer 1912 to produce the desired, occluded billboard on the screen.

Figure 21:
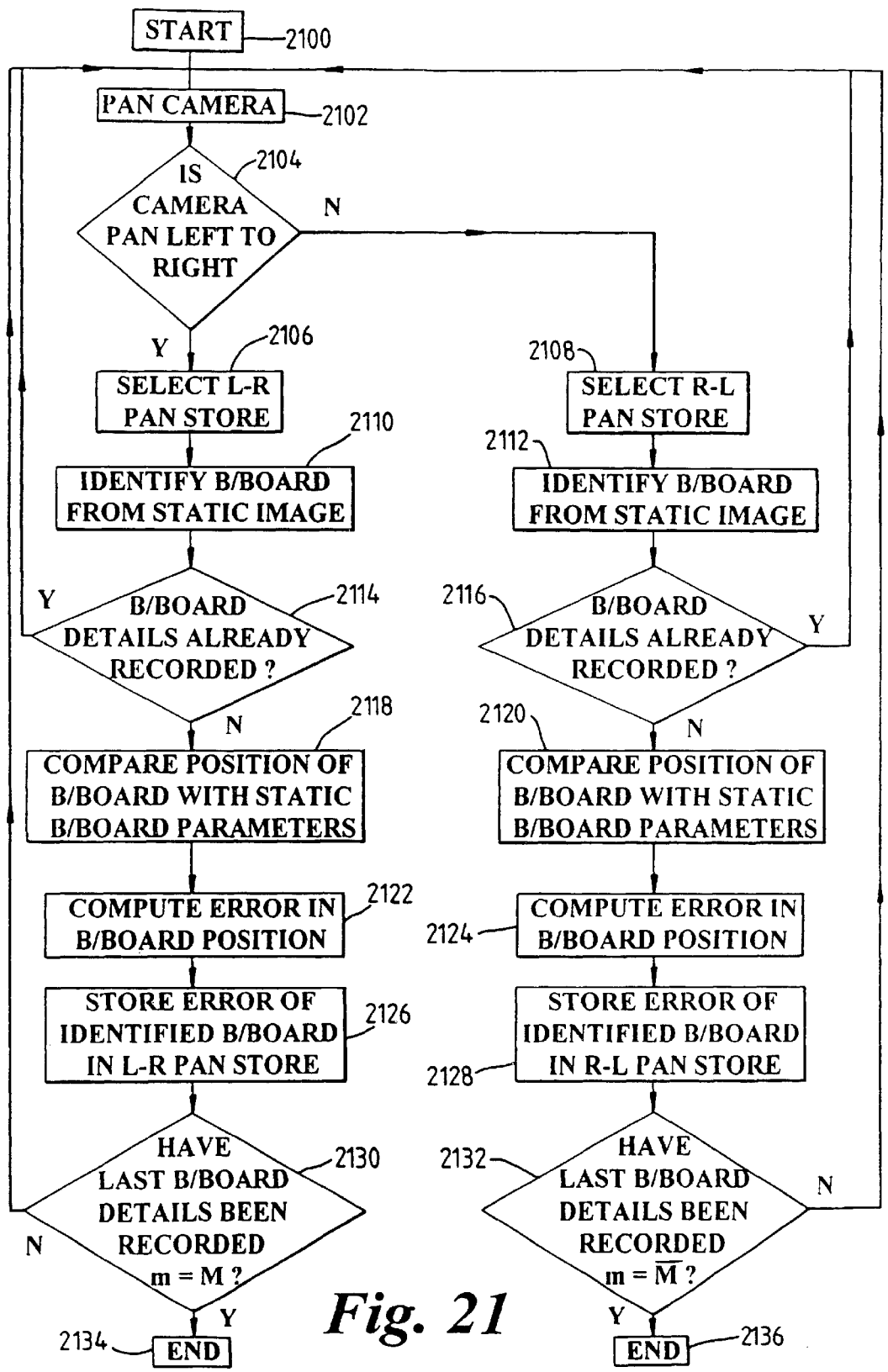
FIG. 21 shows a flow diagram for dynamic set up procedure for camera panning for use with the billboard set up data store of FIG. 20.
Figure 22:
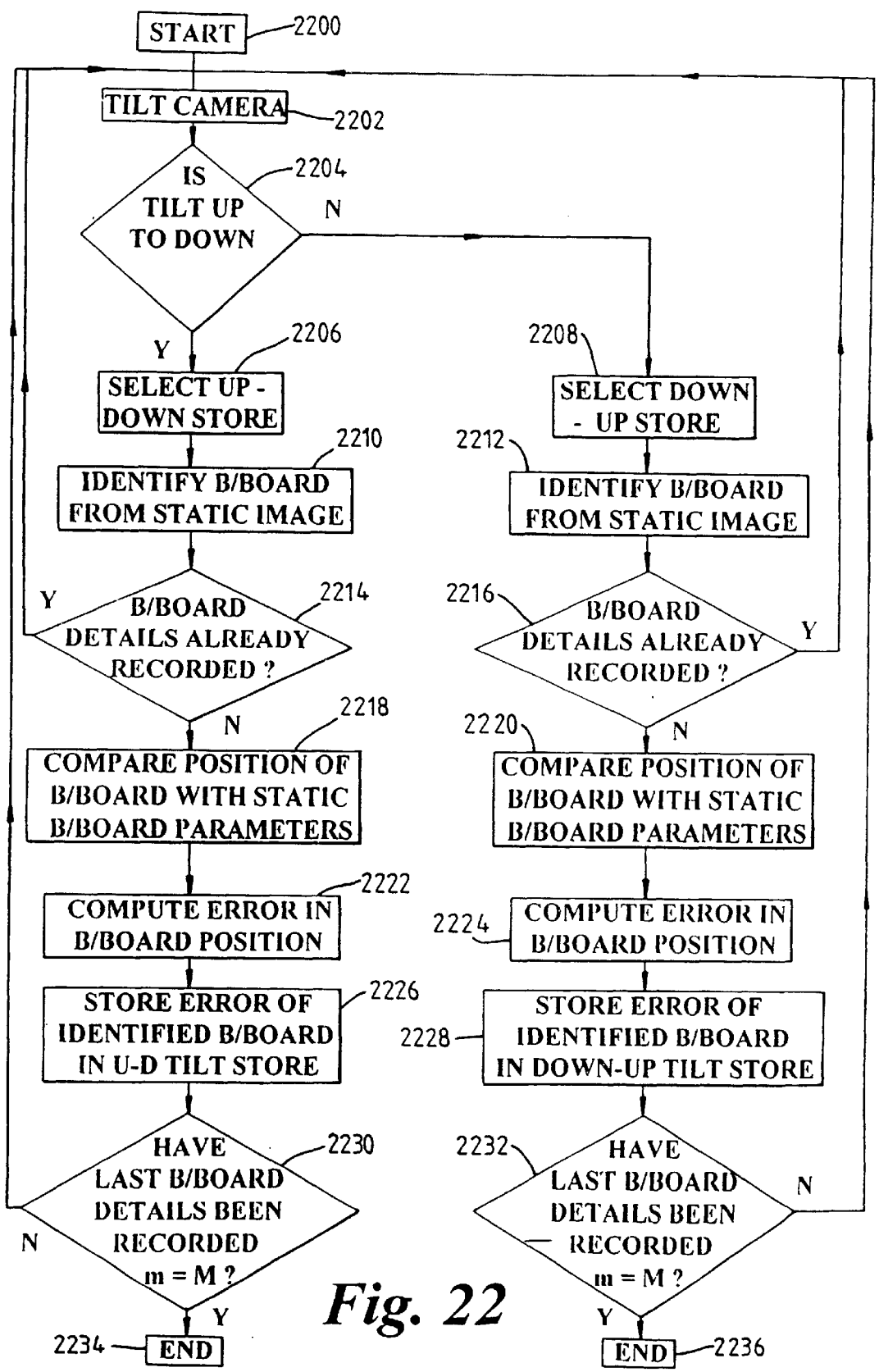
FIG. 22 shows a flow diagram for dynamic set up procedure for camera tilting for use with the billboard set up data store of FIG. 20.

With reference now to FIGS. 20 to 22 in a further embodiment the set up data stored in store 704 is modified prior to any event being televised.

The modification comprises the addition of dynamic set up data as well as the static image and static set up data shown in FIG. 9.

The additional data may be used instead of the dynamic recalibration set up data 910 shown in FIG. 9 or could be used in addition.

In a preferred embodiment it is assumed that the additional data is used instead of the dynamic recalibration procedure and this is now described.

As an introduction, the problems associated with replacing billboards with virtual billboards are discussed. The same problem is identifying the position, size and perspective of the original billboard and then replacing this with the virtual or replacement billboard.

In a static camera situation there is no real problem once the original co-ordinates have been recorded providing that the camera sensors do not drift substantially over time.

However, the inventors have found that during rapid panning or tilting of the camera the co-ordinates 908 of the replacement billboard as recorded in the store 900 do not coincide with the actual position of the billboard in the stadium or venue. This is because the camera sensors exhibit a degree of hysteresis. This can be compensated for by the dynamic recalibration process already described but this may not be practical in some circumstances such as during rapid panning with substantial occlusion of the target billboard.

The hysteresis could possibly be countered by a simple percentage error built into the movement of the camera but this does not produce very good results because it does not take into consideration the camera angle with respect to each billboard nor does it take into account the variability in the camera parameter sensors with angle.

In the present invention therefore in an alternative embodiment, in addition to static billboard set up data the billboard set up data store 900 stores data for each billboard for each camera at least in relation to left-right pan 2002, right-left pan 2004, up-down tilt 2008 and down-up tilt 2006. The data is obtained and stored as now herein described with reference to FIGS. 20 to 22.

FIG. 20 shows the store 900 modified to provide, in addition to the static image data for billboards 1 to M and the static set up data for billboards 1 to M four further sets of data for each billboard 1 to M and these are multiplied to provide this data for each camera.

For each camera the position of each billboard is recorded with the camera panning from left to right 2002 and for right to left 2004. The panning speed may be selected as the normal speed for the event being televised. Thus for example for horse racing it could be low but for motor racing it could be higher. The position of each billboard is then recorded with the camera tilting upwards 2006 and then downwards 2008 across each billboard.

For each measurement the camera zoom and focus are preferably set at a known level at which the billboard being analysed is in a reasonable view at a reasonable size. The zoom and focus could for example be the same as that during the acquisition of the static set up data for each billboard so that a direct comparison with the static set up data can be made. In that case only an error correction figure may need to be recorded.

It is preferable not to select too high a panning or tilting speed because at very high speeds the billboards will in any case be blurred and therefore accuracy of replacement will not be an issue. This procedure is followed for each billboard for each camera and the data is then used during the event to correct the position of each billboard as the camera pans or tilts.

It may be seen that each billboard will be viewed at a different angle by each camera and also that the output of each of the sensors on each camera may vary dependent on the angle through which the camera must turn to view the billboard. By recording the static data and data relating to panning and tilting in both directions the replacement billboard will be accurately positioned in the exact position of the original or real billboard both for static shots and when the camera is moving.

Dynamic recalibration during the event as previously described will ensure, except during very fast camera movements with large occlusion, that the replacement billboard is correctly positioned but the use of static and dynamic set up data will also ensure this unless the camera sensors drift substantially during an event. Thus providing that the camera sensors are of a reasonable quality from the point of view of draft they can be of a variable quality with respect to accuracy during panning and tilting. By careful selection of camera sensors extremely accurate sensors are therefore not required since any variation with respect to camera movement is compensated for by the storage of dynamic set up data.

The data is obtained as described with reference to FIGS. 21 and 22 as follows.

Once the static data relating to each billboard image and its static set up data (906, 908, FIG. 9) has been obtained, sequence 2100 is started and the camera is panned 2102 by the operator at a desired speed relative to the normal panning speed.

The sensors indicate the direction of pan 2106 and dependent on the direction the dynamic data is stored in store 2002 or 2004 in steps 2106 or 2108 by selection of that store. The sequence for both L-R and R-L stores 2002 and 2004 is similar and will be described for the L-R store but using reference numerals for both stores.

As the camera pans L-R each billboard is identified from data stored in store 906 step 2110; 2112. The system asks if the billboard has previously been recoded dynamically step 2114, 2116 and if so it returns to the start of the sequence and repeats steps 2104–2110 until it finds a billboard that has not been dynamically scanned. Once a new billboard has been found the position (co-ordinates) of the billboard during panning is recorded and compared with the static billboard parameters previously stored (908) in step 2118, 2120. Any error is computed (step 2122, 2124) and the errors are stored in L-R and R-L pan stores 2126, 2128 for the billboard. The system asks if all billboards recorded in store 908 have been dynamically scanned both for L-R and R-L (steps 2130, 2132). If not the sequence is continued until the last billboard has been dynamically scanned and then the program is terminated 2134, 2136.

A similar program sequence shown in FIG. 22 is provided for tilting of each camera. Obviously if the cameras are not either allowed to tilt or are unlikely to be tilted to any extent then this sequence and the recordal of data in stores 2006, 2008 may not be necessary.

The sequence is started 2200 and each camera in turn is tilted 2202 and the direction of tilt determined 2204 by the camera sensors. Dependent on whether the camera is tilting up or down dynamic set up data is stored in stores 2006 or 2008 in steps 2206, 2208. Both sequences are similar and only the sequence tilting the camera down will be described with reference then to both sequences.

Each billboard is identified 2210, 2212 from the static image data and also from the camera parameters especially where all real billboards are the same. The program interrogates the billboard data step 2214, 2216 to see if the billboard has already been interrogated. If it has the program restarts but if not the co-ordinate data of the billboard during tilting is compared with the static data step 2218, 2220. The error, if any is computed step 2122, 2124 and stored in the stores 2006, 2008 (FIG. 20) step 2226, 2228.

The program then interrogates stores 2006, 2008 to see if all billboards have been dynamically interrogated for tilt errors in both up (step 2230) and down (step 2232) and if so ends the program steps 2234, 2236. If not the program continues by commencing at the start of the sequence until all boards have been interrogated.

Normally camera zoom and focus will not require the same type of dynamic set up data to be stored. However, if particular camera aberrations are known then these may be compensated for by use of similar dynamic set up data.

The dynamic data stored in stores 2002–2008 may be used instead of or in conjunction with the dynamic recalibration data obtained as described with reference to FIG. 9. Usually however the dynamic set up data will obviate the need for recalibration during most types of event.

During use the system knows by reading the camera sensors whether the billboard is being viewed in a static manner or is being panned past L-R or R-L or tilted past UP or DOWN. In such cases the position of the billboard is taken from the static data store and then if panning or tilting is occurring, the necessary error corrections are applied. Once camera movement ceases the static billboard parameters are reverted to.

What is claimed is:

1. Apparatus for automatic replacement of a billboard in a video image, comprising:
   (i) a camera position store that receives input from sensors of a camera that are indicative of a position of the camera and that stores the input;
   (ii) a billboard position store that stores a position of the billboard;
   (iii) a processor that determines from the stored input in the camera position store and the stored position of the billboard in the billboard position store and independently of a video signal generated by the camera whether the billboard is within the field of view of the camera; and
   (iv) a replacement billboard store that stores a replacement billboard for replacing the billboard when the processor determines that the billboard is within the field of view of the camera.

2. Apparatus for automatic replacement of a billboard in a video image as claimed in claim 1, further comprising a calibration means to periodically automatically calibrate the sensors.

3. Apparatus as claimed in claim 1, wherein the sensors comprise means for measuring the pan tilt, zoom and focus of the camera relative to known reference positions.

4. Apparatus as claimed in claim 2, wherein the sensors comprise means for measuring the pan tilt, zoom and focus of the camera relative to known reference positions.

5. Apparatus as claimed in claim 2, wherein the billboard comprises a chroma-key panel.

6. Apparatus as claimed in claim 5, wherein the panel comprises a patterned chroma-key panel.

7. Apparatus as claimed in claim 6, wherein the pattern comprises two different colors or two different shades of the same color.

8. Apparatus as claimed in claim 7, wherein the pattern is designed to be optimized for use according to the size and shape of the billboard and to the anticipated video conditions.

9. Apparatus as claimed in claim 2, wherein the calibration means includes fine adjustment image processing means including means for perspectively transforming the current video image to provide an estimated transformed model, means for storing a replica of the billboard image the perspectively transformed video image with the stored replica to provide a residual video field, means for solving residual distortion between the transformed model and the residual video field and means for updating the estimated transformation by means of the residual distortion to provide a calibration correction factor.

10. Apparatus as claimed in claim 9, wherein said means for solving residual distortion includes analysis means based in the spatial derivatives of the current image of the transformed model as well as means for analyzing pixel by pixel the image differences of the transformed model and the current image.

11. Apparatus as claimed in claim 9, wherein the fine adjustment image processing means includes means for carrying out the fine adjustment in an interactive manner.

12. Apparatus as claimed in claim 10, wherein the pixel by pixel analysis means includes means for discarding pixels using color variation.

13. Apparatus as claimed in claim 1, further comprising means for recording calibration data obtained during a set up period when no occlusion is present.

14. Apparatus as claimed in claim 1 further comprising a dynamic billboard memory for recording any changes in measured position of the billboard as the camera pans or tilts.

15. An apparatus for automatic measurement of camera orientation, comprising:
   (i) a sensor means for measuring a Field of View (FOV) of a camera relative to a known reference position;
   (ii) an image processing means for processing video signals generated by the camera; and
   (iii) a calibration means for periodically calibrating the sensor means, wherein the calibration means perspectively transforms a current camera image to generate an estminated transformed model, compares a stored image with the estimated transformed model to form a residual video field, and determines residual distortion for calibration by determining residual distortion between the estimated transformed model and the residual video field.

16. A method of automatic replacement of a real billboard in a video image said method comprising the steps of:
   recording the Field of View (FOV) parameters of a TV camera in a first reference position by means of motion sensors attached to the camera;
   storing a position of the real billboard in a billboard store;
   storing a position of the camera sensed by the motion sensors in a camera position store;
   determining from the camera position store and the stored position in the billboard store and independently of a video signal generated by the camera whether the real billboard is within the field of view of the camera; and
   replacing the real billboard with a replacement billboard when the processor determines that the real billboard is within the field of view of the camera.

17. The method as claimed in claim 16, wherein storing a position of the camera comprises measuring the pan, tilt, zoom or focus of the camera with the motion sensors attached to the camera.

18. The method of claim 16 wherein the billboard comprises a chroma-key panel and in which replacement of the real billboard with the replacement billboard includes the step of occluding said replacement billboard by any object occluding said real billboard.

19. The method of claim 16 further comprising periodically automatically calibrating the motion sensors by perspectively transforming the current video image to provide an estimated transformed model, storing a replica of the billboard image, comparing the perspectively transformed video image with the stored replica to provide a residual video field, solving residual distortion between the transformed model and the residual video field and updating the estimated transformation by means of the residual distortion to provide a calibration correction factor.

20. The method of claim 16, wherein said step of solving the residual distortion includes analysis based in the spatial derivatives of the current image of the transformed model and analyzing pixel by pixel the image differences of the transformed model and the current image.

21. The method of claim 16, wherein automatically calibrating the motion sensors further comprises interactively calibrating the motion sensors.

22. The method of claim 20, wherein the pixel by pixel analysis step includes discarding pixels by using color variation.

23. The method of claim 16, wherein the step of recording calibration data is carried out during a set up period when no occlusion is present.

24. The method of claim 16, further comprising calibrating a difference signal for recalibration of the motion sensors when the present video image is above a predetermined quality factor.

25. The method of claim 24, wherein the replacement billboard is positioned at the last recalibrated position in the event that a recalibration is not possible due to the present video image being below the predetermined quality factor.

* * * * *